United States Patent
Zhang et al.

(10) Patent No.: US 12,096,452 B2
(45) Date of Patent: Sep. 17, 2024

(54) TRANSMITTING METHOD AND DEVICE FOR TRANSMISSION, AND STORAGE MEDIUM

(71) Applicant: ZTE CORPORATION, Guangdong (CN)

(72) Inventors: Chenchen Zhang, Guangdong (CN); Peng Hao, Guangdong (CN); YuNgok Li, Guangdong (CN); Xingguang Wei, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 407 days.

(21) Appl. No.: 17/599,890

(22) PCT Filed: Mar. 24, 2020

(86) PCT No.: PCT/CN2020/080865
§ 371 (c)(1),
(2) Date: Sep. 29, 2021

(87) PCT Pub. No.: WO2020/199978
PCT Pub. Date: Oct. 8, 2020

(65) Prior Publication Data
US 2022/0174715 A1    Jun. 2, 2022

(30) Foreign Application Priority Data
Mar. 29, 2019   (CN) .......................... 201910252486.0

(51) Int. Cl.
*H04W 72/23*    (2023.01)
*H04L 1/1812*   (2023.01)
(Continued)

(52) U.S. Cl.
CPC ........... *H04W 72/23* (2023.01); *H04L 1/1812* (2013.01); *H04L 5/0053* (2013.01);
(Continued)

(58) Field of Classification Search
CPC ............. H04W 72/23; H04W 72/0446; H04W 72/1268; H04W 74/0841; H04L 1/1812;
(Continued)

(56) References Cited

U.S. PATENT DOCUMENTS

2014/0321389 A1    10/2014  Zhang
2017/0013565 A1*    1/2017  Pelletier .............. H04W 52/146
(Continued)

FOREIGN PATENT DOCUMENTS

| CA | 3072524 A1 | 2/2019 |
|----|------------|--------|
| CN | 102510577 A | 6/2012 |

(Continued)

OTHER PUBLICATIONS

European Patent Office, The extended European search report issued on Nov. 4, 2022 for application No. EP20782926.8.
(Continued)

*Primary Examiner* — Nizam U Ahmed
(74) *Attorney, Agent, or Firm* — Li & Cai Intellectual Property (USA) Office (57) ABSTRACT

The present application relates to a field of communications. A transmitting method and device for transmission, and a storage medium are disclosed. The method includes: determining, by a transmitting terminal, to transmit a first transmission or a second transmission by at least one of following means: the transmitting terminal determining the first transmission or the second transmission according to received downlink control information (DCI); the transmitting terminal determining the first transmission or the second transmission no later than a time threshold; or the transmitting terminal determining the first transmission or the second transmission according to a specified rule, where the DCI is used for scheduling or activating at least one of the first transmission and the second transmission; and transmitting,
(Continued)

by the transmitting terminal, the determined first transmission or second transmission.

20 Claims, 3 Drawing Sheets (51) Int. Cl.
    *H04L 5/00*     (2006.01)
    *H04W 72/0446*     (2023.01)
    *H04W 72/1268*     (2023.01)
    *H04W 74/0833*     (2024.01)

(52) U.S. Cl.
    CPC ... *H04W 72/0446* (2013.01); *H04W 72/1268* (2013.01); *H04W 74/0841* (2013.01)

(58) Field of Classification Search
    CPC ... H04L 5/0053; H04L 5/0007; H04L 5/0005; H04L 5/001; H04L 5/0055; H04L 5/0058
    See application file for complete search history.

(56) References Cited

U.S. PATENT DOCUMENTS

2018/0070316 A1    3/2018  Sun et al.
2019/0230635 A1*  7/2019  Takeda ................. H04W 72/23

FOREIGN PATENT DOCUMENTS

| CN | 103200663 A | 7/2013 |
|----|-------------|--------|
| CN | 109392126 A | 2/2019 |
| WO | 2015116866 A1 | 8/2015 |

OTHER PUBLICATIONS

China Patent Office, Second Office Action issued on Dec. 28, 2022 for application No. CN201910252486.0.
WIPO, International Search Report issued on Jun. 8, 2020.
NTT Docomo: "Views on open issues for dual connectivity", 3GPP TSG RAN WG1 Meeting #76, Feb. 14, 2014.
Indian Patent Office, First Office Action issued Feb. 5, 2024 for application No. IN202117049342.

* cited by examiner

TRANSMITTING METHOD AND DEVICE FOR TRANSMISSION, AND STORAGE MEDIUM

The present application is a National Stage of International Application No. PCT/CN2020/080865, filed on Mar. 24, 2020, which claims priority to Chinese Patent Application No. 201910252486.0 filed on Mar. 29, 2019, in Chinese Patent Office, both of which are incorporated by reference herein in their entireties.

TECHNICAL FIELD

The present application relates to a field of communications, for example, to a transmitting method and device for transmission, and a storage medium.

BACKGROUND

In order to support coexistence of Long Term Evolution (abbreviated as LTE) and New Radio (abbreviated as NR), a Dual Connection (abbreviated as DC) mode is adopted, which specifically includes EN-DC in which the LTE is a Main Carrier Group (abbreviated as MCG), the NR is a Secondary Cell Group (abbreviated as SCG), and NE-DC in which the NR is an MCG and the LTE is an SCG, where E represents an E-UTRA, i.e., a 4G radio access network, and N represents the NR, i.e., a 5G NR; NG represents a next generation core network, i.e., a 5G core network, the EN-DC represents to the DC of the 4G radio access network and the 5G NR, NE-DC refers to the DC of the 4G Radio access network and the 5G NR under the 5G core network, and NR-DC is also supported in an NR system, i.e., the MCG is the NR and the SCG is the NR.

In NR R15, the priorities of various uplink transmission channels or signals in a Carrier Aggregation (abbreviated as CA) scenario are discussed, and when a UE needs to transmit multiple uplink transmission channels or signals with completely or partially overlapping time-domain resources, if the total uplink transmission power of the UE cannot satisfy the requirements of all uplink transmission channels or signals, the UE needs to determine, according to the priority ranking, that limited uplink transmission power is preferentially allocated to uplink transmission channels or signals with higher priorities. The priority ranking rules given in the NR R15 are as follows.

1) Within a carrier group (CG, i.e., an MCG or an SCG), there is the following priority ranking: PRACH on primary cell>PUCCH with HARQ-ACK/SR=PUSCH with HARQ-ACK>PUCCH with CSI=PUSCH with CSI>PUSCH with UCI>A-SRS>P-/SP-SRS=PRACH on secondary cell.

2) For a same uplink transmission channel or signal, in a CG (i.e., an MCG or an SCG), the priority when transmitting in a primary cell>the priority when transmitting in a secondary cell.

Based on the above priority rules, the UE will determine the allocation of uplink power between multiple uplink transmission channels or signals.

In the NR R15, the problem that how LTE and NR carriers co-exist in the EN-DC or NE-DC scenarios is also discussed. No matter for the EN-DC or the NE-DC, when an uplink transmission power of a transmitting terminal is limited, for a transmitting terminal which does not support the dynamic power sharing capability, the transmitting terminal may preferentially ensure an uplink transmission of an LTE carrier and cancel the uplink transmission of an NR carrier; and for a transmitting terminal supporting the dynamic power sharing capability, the transmitting terminal may preferentially ensure the uplink transmission of the LTE carrier, and cancel the uplink transmission of the NR carrier or reduce the transmitting power of the NR carrier.

In the NR R15, the problem about Single Tx is also discussed. When a transmitting terminal cannot guarantee that uplink transmissions with overlapping time-domain resources are transmitted on multiple CGs, a UE may transmit the uplink transmissions on only one CG.

For the EN-DC, the NE-DC or the NR-DC, when multiple carriers have downlink or uplink transmission requirements, if the transmission times of these transmissions are completely or partially overlapped, for uplink transmissions, it may be limited by the transmission power of the transmitting terminal, and it cannot be guaranteed that the overlapped multiple uplink transmissions are transmitted according to the required power; and for downlink transmissions, considering interference between the multiple transmissions, it may not be guaranteed that the transmitting terminal demodulates the overlapping multiple downlink transmissions well.

In the related art, no effective technical scheme is provided for realizing the transmitting of multiple transmissions, when the downlink or the uplink cannot guarantee the transmitting of the multiple transmissions with overlapping time-domain resources.

SUMMARY

Embodiments of the present application provides a transmitting method and device for transmission, and a storage medium, so as to at least solve the problem in the related art how to transmit multiple transmissions, when the downlink or the uplink cannot guarantee the transmitting of the multiple transmissions with overlapping time-domain resources.

According to an embodiment of the present application, a transmitting method for transmission is provided, including: determining, by a transmitting terminal, to transmit a first transmission or a second transmission by at least one of following means: the transmitting terminal determining the first transmission or the second transmission according to received downlink control information (DCI); the transmitting terminal determining the first transmission or the second transmission no later than a time threshold; or the transmitting terminal determining the first transmission or the second transmission according to a specified rule, where the DCI is used for scheduling or activating at least one of the first transmission and the second transmission; and transmitting, by the transmitting terminal, the determined first transmission or second transmission.

According to another embodiment of the present invention, there is also provided a transmission device for transmission, applied to a transmitting terminal, including: a determination module, configured to determine to transmit a first transmission or a second transmission by at least one of following means: determining the first transmission or the second transmission according to received DCI; the transmitting terminal determining the first transmission or the second transmission no later than a time threshold; or determining the first transmission or the second transmission according to a specified rule, where the DCI is used for scheduling or activating at least one of the first transmission and the second transmission; and a transmission module, configured to transmit the determined first transmission or second transmission.

According to another embodiment of the present application, there is also provided a storage medium having a computer program stored thereon. The computer program is configured to execute the transmitting method for transmission described in any one of the above when executed.

According to the present application, a transmitting terminal determines to transmit a first transmission or a second transmission by at least one of the following means: the transmitting terminal determining the first transmission or the second transmission according to received DCI; the transmitting terminal determining the first transmission or the second transmission no later than a time threshold; or the transmitting terminal determining the first transmission or the second transmission according to the specified rule, where the DCI is used for scheduling or activating at least one of the first transmission and the second transmission; and the transmitting terminal transmits the determined first transmission or the second transmission. By adopting the technical solution described above, the problems in the related art how to transmit multiple transmissions when the downlink or the uplink cannot guarantee the transmitting of the multiple transmissions with multiple overlapping time-domain resources and the like are solved, and a method for determining to transmit the first transmission or the second transmission is provided.

BRIEF DESCRIPTION OF THE DRAWINGS

The accompanying drawings are explained herein to provide a further understanding of the present application and constitute a part of the present application, illustrate embodiments of the present application and together with the description serve to explain the application and not to limit the application. In the drawings.

DETAILED DESCRIPTION

The present application will be described in detail below with reference to the accompanying drawings in conjunction with embodiments. It should be noted that, in the present application, the embodiments and features of the embodiments may be combined with each other without conflict.

It should be noted that the terms "first", "second" and the like in the description and claims of the present application and in the accompanying drawings are used for distinguishing between similar elements and not necessarily for describing a particular sequential or chronological order.

The embodiments of the application mainly aim at an EN-DC, an NE-DC or an NR-DC, and at providing a method that is needed to determine priorities of multiple transmissions, so as to guarantee some transmissions preferentially to realize Single Tx, or enable transmission powers of other transmissions to be reduced.

Figure 1:
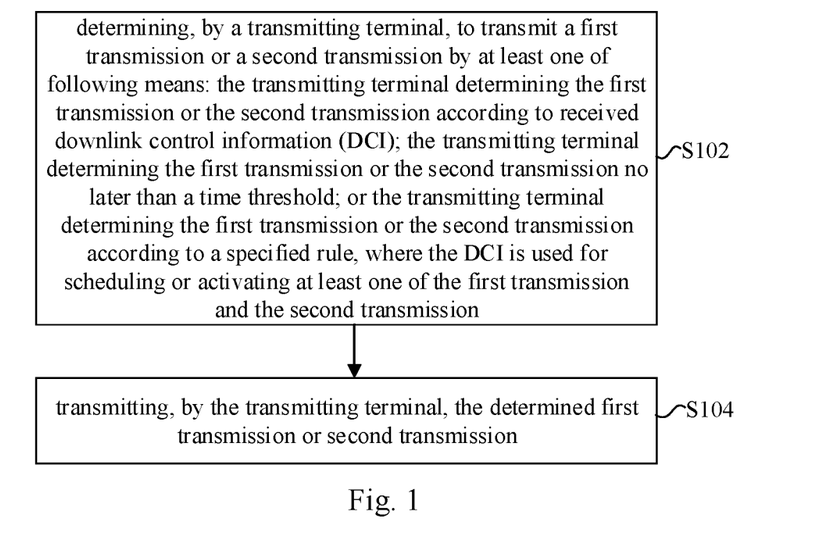
FIG. 1 is a flow chart of a transmitting method for transmission according to an embodiment of the present application.

The embodiments of the present application provide a transmitting method for transmission, and FIG. 1 is a flow chart of a transmitting method for transmission according to an embodiment of the present application. As shown in FIG. 1, the transmitting method for transmission includes the following steps.

In step S102, it is determined by a transmitting terminal to transmit a first transmission or a second transmission by at least one of following means: the transmitting terminal determining the first transmission or the second transmission according to received DCI; the transmitting terminal determining the first transmission or the second transmission no later than a time threshold; or the transmitting terminal determining the first transmission or the second transmission according to a specified rule. The DCI is used for scheduling or activating at least one of the first transmission and the second transmission.

In step S104, the determined first transmission or second transmission is transmitted by the transmitting terminal.

According to the present application, a transmitting terminal determines to transmit a first transmission or a second transmission by at least one of the following means: the transmitting terminal determining the first transmission or the second transmission according to received DCI; the transmitting terminal determining the first transmission or the second transmission no later than a time threshold; or the transmitting terminal determining the first transmission or the second transmission according to the specified rule, where the DCI is used for scheduling or activating at least one of the first transmission and the second transmission; and the transmitting terminal transmits the determined first transmission or the second transmission. By adopting the technical solution described above, the problems in the related art how to transmit multiple transmissions when the downlink or the uplink cannot guarantee the transmitting of the multiple transmissions with multiple overlapping time-domain resources and the like are solved, and a method for determining to transmit the first transmission or the second transmission is provided.

In an optional embodiment of the present invention, a time-domain resource of the first transmission and a time-domain resource of the second transmission overlap completely or partially.

In an optional embodiment of the present invention, it is determined by the transmitting terminal to transmit the first transmission or the second transmission in a specific time-frequency resource, and the specific time-domain resource at least includes one of: the time-domain resource includes an available uplink resource of a CG 1; the time-domain resource includes an unavailable uplink resource of the CG 1; the time-domain resource includes an uplink resource of the CG 1 which can be used for Hybrid Automatic Repeat reQuest Acknowledgement (HARQ-ACK) feedback; the time-domain resource includes an uplink resource of the CG 1 which cannot be used for HARQ-ACK feedback; the time-domain resource includes an available uplink resource of a CG 2; the time-domain resource includes an unavailable uplink resource of the CG 2; the time-domain resource includes an uplink resource of the CG 2 which can be used for HARQ-ACK feedback; the time-domain resource includes an uplink resource of the CG 2 which cannot be used for HARQ-ACK feedback; and the time-domain resource is configured to the transmitting terminal through a high-level signaling.

In an optional embodiment of the present invention, the transmitting terminal determining to transmit the first transmission or the second transmission according to the received DCI includes: if DCI for scheduling or activating the first transmission is received firstly, then the transmitting terminal determines to transmit the first transmission, and cancels to transmit the second transmission; and if DCI for scheduling or activating the second transmission is received firstly, the transmitting terminal determines to transmit the second transmission and cancels to transmit the first transmission.

In an optional embodiment of the present invention, a minimum value of the time threshold includes: a first time unit after a time unit in which the DCI for scheduling or activating a first carrier or CG of the first transmission is received by the transmitting terminal. A maximum value of the time threshold includes: a T-th time unit forward from a time unit prior to a start time unit of the first transmission or the second transmission, where T is an integer.

In an optional embodiment of the present invention, the maximum value of the time threshold is associated with a processing delay of the transmitting terminal.

In an optional embodiment of the present invention, the maximum value of the time threshold is predefined by a system or semi-statically configured by a base station to the transmitting terminal, and T is predefined by the system or semi-statically configured by the base station to the terminal.

In an optional embodiment of the present invention, the maximum value of the time threshold is associated with a capability of the transmitting terminal.

In an optional embodiment of the present invention, T includes one of: T being equal to $T_{proc,1}^{max}$ OFDM symbols, where $T_{proc,1}^{max}=(N_1+d_{1,1}+1)\cdot(2048+144)\cdot\kappa\cdot2^{-\mu}\cdot T_C$; T being equal to $T_{proc,release}^{max}$ OFDM symbols, where $T_{proc,release}^{max}=(N+1)\cdot(2048+144)\cdot\kappa\cdot2^{-\mu}\cdot T_C$; T being equal to $T_{proc,2}^{max}$ OFDM symbols, where $T_{proc,2}^{max}=((N_2+d_{2,1}+1)\cdot(2048+144)\cdot\kappa\cdot2^{-\mu}\cdot T_C, d_{2,2})$; T being equal to $T_{proc,CSI}^{max}$ OFDM symbols, where $T_{proc,CSI}^{max}=\max(Z+d)\cdot(2048+144)\cdot\kappa\cdot2^{-\mu}\cdot T_C, d_{2,2})$; T being equal to the minimum value of a plurality of K2 candidate values semi-statically configured, where the unit is slot; or T being equal to 0.

In an optional embodiment of the present invention, the transmitting terminal determining to transmit the first transmission or the second transmission according to the specified rule includes: the transmitting terminal determining to transmit the first transmission or the second transmission, according to a transmission type of the first transmission and/or a transmission type of the second transmission.

In an optional embodiment of the present invention, the transmitting terminal determining to transmit the first transmission or the second transmission according to the transmission type of the first transmission and/or the transmission type of the second transmission includes one of: in the case where the first transmission is a Physical Random Access Channel (abbreviated as PRACH) and the second transmission is an uplink channel or signal other than the PRACH, it is determined by the transmitting terminal to transmit the first transmission and cancel the second transmission; in the case where the second transmission is a PRACH, and the first transmission is an uplink channel or signal other than the PRACH, it is determined by the transmitting terminal to transmit the second transmission and cancel the first transmission; in the case where the first transmission is an NR PRACH and the second transmission is an uplink channel or signal other than an LTE PRACH, it is determined by the transmitting terminal to transmit the first transmission and cancel the second transmission; in the case where the second transmission is the NR PRACH, and the first transmission is an uplink channel or signal other than the LTE PRACH, it is determined by the transmitting terminal to transmit the second transmission and cancel the first transmission; in the case where the first transmission is a Physical Uplink Control Channel (abbreviated as PUCCH) or Physical Uplink Shared Channel (abbreviated as PUSCH) including an NR HARQ-ACK, and the second transmission does not include the NR HARQ-ACK, it is determined by the transmitting terminal to transmit the first transmission and cancel the second transmission; in the case where the second transmission is the PUCCH or PUSCH including the NR HARQ-ACK, and the first transmission does not include the HARQ-ACK, it is determined by the transmitting terminal to transmit the second transmission and cancel the first transmission; in the case where the first transmission is a PUCCH or PUSCH including the LTE HARQ-ACK, and the second transmission does not include the HARQ-ACK, it is determined by the transmitting terminal to transmit the first transmission and cancel the second transmission; in the case where the first transmission is a PUCCH or PUSCH including the NR uplink control information (UCI), and the second transmission does not include the UCI, it is determined by the transmitting terminal to transmit the first transmission and cancel the second transmission; in the case where the second transmission is the PUCCH or PUSCH including the UCI, and the first transmission does not include the UCI, it is determined by the transmitting terminal to transmit the second transmission and cancel the first transmission; in the case where the first transmission is a URLLC transmission, and the second transmission is a non-URLLC transmission, it is determined by the transmitting terminal to transmit the first transmission and cancel the second transmission; in the case where the second transmission is the URLLC transmission, and the first transmission is the non-URLLC transmission, it is determined by the transmitting terminal to transmit the second transmission and cancel the first transmission; in the case where the first transmission is the PUCCH, and the second transmission is an uplink channel or signal other than the PUCCH, it is determined by the transmitting terminal to transmit the first transmission and cancel the second transmission; in the case where the second transmission is the PUCCH, and the first transmission is an uplink channel or signal other than the PUCCH, it is determined by the transmitting terminal to transmit the second transmission and cancel the first transmission; in the case where the first transmission is a PUCCH or PUSCH including an HARQ-ACK, and the second transmission is an uplink channel or signal that does not include the HARQ-ACK, it is determined by the transmitting terminal to transmit the first transmission and cancel the second transmission; in the case where the second transmission is the PUCCH or PUSCH including the HARQ-ACK, and the first transmission is an uplink channel or signal that does not include the HARQ-ACK, it is determined by the transmitting terminal to transmit the second transmission and cancel the first transmission; in the case where the first transmission is a PUSCH or PUCCH scheduled by DCI, or a Sounding Reference Signal (abbreviated as SRS), and the second transmission is a transmission or transmission resource configured by a Radio Resource Control (abbreviated as RRC) signaling, e.g., a configured grant resource, a PUCCH, a PRACH, or a SRS, it is determined by the transmitting terminal to transmit the second transmission and cancel the first transmission; and in the case where the first transmission is an LTE PUSCH or LTE PUCCH scheduled by LTE DCI, or an LTE SRS, and the second transmission is a transmission or transmission resource configured by an RRC signaling, e.g., a configured grant resource, an NR PUCCH, an NR PRACH, or an NR SRS, it is determined by the transmitting terminal to transmit the second transmission and cancel the first transmission.

In an optional embodiment of the present invention, the transmitting terminal determining to transmit the first transmission or the second transmission according to the specified rule includes: if the CG 1 is a MCG and the CG 2 is an SCG, it is determined by the transmitting terminal to transmit the first transmission and cancel the second transmission; if the CG 2 is the MCG and the CG 1 is the SCG, it is determined by the transmitting terminal to transmit the second transmission and cancel the first transmission; if the CG 1 is an LTE CG and the CG 2 is an NR CG, it is determined by the transmitting terminal to transmit the first transmission and cancel the second transmission; and if the CG 2 is the LTE CG and the CG 1 is the NR CG, it is determined by the transmitting terminal to transmit the second transmission and cancel the first transmission.

In an optional embodiment of the invention, the first transmission is scheduled to be transmitted on a first carrier or a first CG, and the second transmission is scheduled to be transmitted on a second carrier or a second CG.

Through the description of the foregoing embodiments, it is clear to those skilled in the art that the method according to the foregoing embodiments may be implemented by software plus a necessary general hardware platform, and certainly may also be implemented by hardware, but the former is a better implementation mode in many cases. Based on such understanding, the technical solutions of the present application or portions contributing to the prior art may be embodied in the form of a software product, where the computer software product is stored in a storage medium (such as a Read-Only Memory (ROM)/Random Access Memory (RAM), a magnetic disk, and an optical disk), and includes several instructions for enabling a transmitting terminal device (which may be a mobile phone, a computer, a server, or a network device, etc.) to execute the method of the embodiments of the present application.

In the present embodiment, there is also provided a transmitting device for transmission, applied to a transmitting terminal, and used to implement the foregoing embodiments and preferred embodiments, and details of which have been already described are not repeated. As used below, the term "module" may be a combination of software and/or hardware that implements a predetermined function. Although the means described in the embodiments below are preferably implemented in software, an implementation in hardware or a combination of software and hardware is also possible and contemplated.

Figure 2:
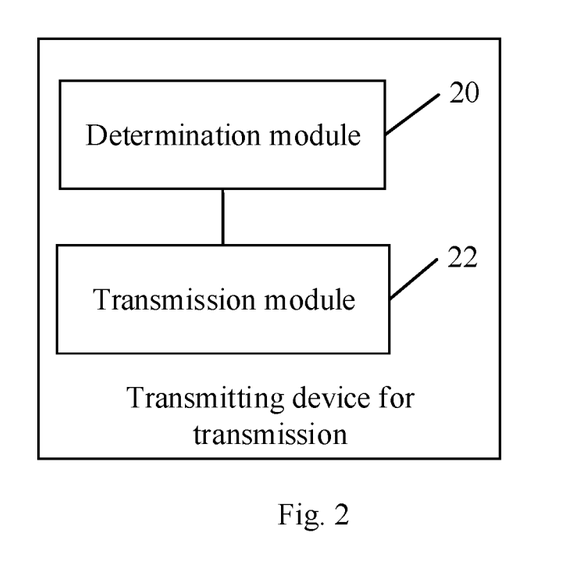
FIG. 2 is a block diagram of a transmitting device for transmission according to an embodiment of the present application.

FIG. 2 is a block diagram of a transmitting device for transmission according to an embodiment of the present application, and as shown in FIG. 2, the device includes the followings.

A determination module 20 is configured to determine to transmit a first transmission or a second transmission by at least one of following means: a transmitting terminal determining the first transmission or the second transmission according to received DCI; the transmitting terminal determining the first transmission or the second transmission no later than a time threshold; or the transmitting terminal determining the first transmission or the second transmission according to a specified rule. The DCI is used for scheduling or activating at least one of the first transmission and the second transmission.

A transmission module 22 is configured to transmit the determined first transmission or second transmission.

According to the present application, it is determined to transmit a first transmission or a second transmission by at least one of the following means: a transmitting terminal determining the first transmission or the second transmission according to received DCI; the transmitting terminal determining the first transmission or the second transmission no later than a time threshold; or the transmitting terminal determining the first transmission or the second transmission according to the specified rule, where the DCI is used for scheduling or activating at least one of the first transmission and the second transmission; and the transmitting terminal transmits the determined first transmission or the second transmission. By adopting the technical solution described above, the problems in the related art how to transmit multiple transmissions when the downlink or the uplink cannot guarantee the transmitting of the multiple transmissions with multiple overlapping time-domain resources and the like are solved, and a method for determining to transmit the first transmission or the second transmission is provided.

In an optional embodiment of the present invention, a time-domain resource of the first transmission and a time-domain resource of the second transmission overlap completely or partially.

In an optional embodiment of the present invention, the determination module 20 is configured to determine to transmit the first transmission or the second transmission in a specific time-frequency resource, where the specific time-domain resource at least includes one of: the time-domain resource includes an available uplink resource of a CG 1; the time-domain resource includes an unavailable uplink resource of the CG 1; the time-domain resource includes an available uplink resource of a CG 2; the time-domain resource includes an unavailable uplink resource of the CG 2; and the time-domain resource is configured to the terminal through a high-level signaling.

In an optional embodiment of the present invention, the determination module 20 is configured to determine to transmit the first transmission and cancel to transmit the second transmission, if DCI for scheduling or activating the first transmission is received firstly; and determine to transmit the second transmission and cancel to transmit the first transmission, if DCI for scheduling or activating the second transmission is received firstly.

In an optional embodiment of the invention, a minimum value of the time threshold includes: a first time unit after a time unit in which the DCI for scheduling or activating a first carrier or a CG of the first transmission is received by the transmitting terminal. A maximum value of the time threshold includes: a T-th time unit forward from a time unit prior to a start time unit of the first transmission or the second transmission. T is an integer, and the time unit is a subframe, a slot, a mini-slot, or an Orthogonal Frequency Division Multiplexing (abbreviated as OFDM) symbol.

In an optional embodiment of the present invention, the maximum value of the time threshold is associated with a processing delay of the transmitting terminal.

In an optional embodiment of the present invention, the maximum value of the time threshold is predefined by a system or configured by a base station in a semi-static manner to the transmitting terminal, and T is predefined by the system or configured by the base station in the semi-static manner to the terminal.

In an optional embodiment of the present invention, the maximum value of the time threshold is associated with a capability of the transmitting terminal.

In an optional embodiment of the invention, T includes one of: T being equal to $T_{proc,1}^{max}$ OFDM symbols, where $T_{proc,1}^{max}=(N_1+d_{1,1}+1)\cdot(2048+144)\cdot\kappa\cdot 2^{-\mu}\cdot T_C$; T being equal to $T_{proc,release}^{max}$ OFDM symbols, where $T_{proc,release}^{max}=(N+1)\cdot(2048+144)\cdot\kappa\cdot 2^{-\mu}\cdot T_C$; T being equal to $T_{proc,2}^{max}$ OFDM symbols, where $T_{proc,2}^{max}=\max((N_2+d_{2,1}+1)\cdot(2048+144)\cdot\kappa\cdot 2^{-\mu}\cdot T_C, d_{2,2})$ T being equal to $T_{proc,CSI}^{max}$ OFDM symbols, where $T_{proc,CSI}^{max}=\max(Z+d)\cdot(2048+144)\cdot\kappa\cdot 2^{-\mu}\cdot T_C, d_{2,2})$; T being equal to the minimum value of a plurality of K2 candidate values semi-statically configured, where the unit is slot; or T being equal to 0.

In an optional embodiment of the present invention, the determination module 20 is configured to determine to transmit the first transmission or the second transmission, according to a transmission type of the first transmission and/or a transmission type of the second transmission.

In an optional embodiment of the present invention, the determination module 20 is configured to: determine to transmit the first transmission and cancel the second transmission, in the case where the first transmission is a PRACH and the second transmission is an uplink channel or signal other than the PRACH; determine to transmit the second transmission and cancel the first transmission, in the case where the second transmission is a PRACH, and the first transmission is an uplink channel or signal other than the PRACH; determine to transmit the first transmission and cancel the second transmission, in the case where the first transmission is a NR PRACH and the second transmission is an uplink channel or signal other than an LTE PRACH; determine to transmit the second transmission and cancel the first transmission, in the case where the second transmission is the NR PRACH, and the first transmission is an uplink channel or signal other than the LTE PRACH; determine to transmit the first transmission and cancel the second transmission, in the case where the first transmission is a PUCCH or PUSCH including an NR HARQ-ACK, and the second transmission does not include the NR HARQ-ACK; determine to transmit the second transmission and cancel the first transmission, in the case where the second transmission is the PUCCH or PUSCH including the NR HARQ-ACK, and the first transmission does not include the HARQ-ACK; determine to transmit the first transmission and cancel the second transmission, in the case where the first transmission is a PUCCH or PUSCH including NR UCI, and the second transmission does not include the NR UCI; determine to transmit the second transmission and cancel the first transmission, in the case where the second transmission is the PUCCH or PUSCH including the NR UCI, and the first transmission does not include the NR UCI; determine to transmit the first transmission and cancel the second transmission, in the case where the first transmission is a URLLC transmission, and the second transmission is a non-URLLC transmission; determine to transmit the second transmission and cancel the first transmission, in the case where the second transmission is the URLLC transmission, and the first transmission is the non-URLLC transmission; determine to transmit the first transmission and cancel the second transmission, in the case where the first transmission is the PUCCH, and the second transmission is an uplink channel or signal other than the PUCCH; determine to transmit the second transmission and cancel the first transmission, in the case where the second transmission is the PUCCH, and the first transmission is an uplink channel or signal other than the PUCCH; determine to transmit the first transmission and cancel the second transmission, in the case where the first transmission is a PUCCH or PUSCH including an HARQ-ACK, and the second transmission is an uplink channel or signal that does not include the HARQ-ACK; determine to transmit the second transmission and cancel the first transmission, in the case where the second transmission is the PUCCH or PUSCH including the HARQ-ACK, and the first transmission is an uplink channel or signal that does not include the HARQ-ACK; or determine to transmit the second transmission and cancel the first transmission, in the case where the first transmission is a PUSCH or PUCCH scheduled by DCI, or a SRS, and the second transmission is a transmission or transmission resource configured by a RRC signaling, e.g., a configured grant resource, a PUCCH, a PRACH, or a SRS.

The CG 1 may be the NR CG or the LTE CG, and the CG 2 may be the NR CG or the LTE CG.

In an optional embodiment of the present invention, the determination module 20 determining to transmit the first transmission or the second transmission according to the specified rule includes: if the CG 1 is a MCG and the CG 2 is an SCG, the first transmission is transmitted, and the second transmission is cancelled; if the CG 2 is the MCG and the CG 1 is the SCG, then the second transmission is transmitted, and the first transmission is cancelled; if the CG 1 is the LTE CG and the CG 2 is the NR CG, the first transmission is transmitted, and the second transmission is cancelled; or if the CG 2 is the LTE CG and the CG 1 is the NR CG, and the second transmission is transmitted, the first transmission is cancelled.

In an optional embodiment of the invention, the first transmission is scheduled to be transmitted on a first carrier or a first CG, and the second transmission is scheduled to be transmitted on a second carrier or a second CG.

It should be noted that the technical solutions of the foregoing embodiments may be used in combination or may be used alone, and the embodiments of the present application are not limited thereto.

The above technical solutions are described below with reference to preferred embodiments, but are not limited to the technical solutions of the embodiments of the present application.

Preferred Embodiment 1

The CG 1 and the CG 2 are used as the DC. In order to prevent the uplink transmission times of the CG 1 and the CG 2 conflict, that is, to prevent the transmission times of a certain uplink transmission Trans 1 on the CG 1 and a certain uplink transmission Trans 2 on the CG 2 from being completely or partially overlapped, frame structure configuration information is exchanged between a CG 1 site and a CG 2 site through an interface between a CG 1 base station and a CG 2 base station. Specifically, at least one of the following methods may be adopted.

The CG 1 transmits its own semi-static frame configuration to the CG 2 via the interface between the CG 1 base station and the CG 2 base station, for example, an Xn interface, and the CG 2 receives the semi-static frame configuration of the CG 1 via the interface between the CG 1 base station and the CG 2 base station, for example, the Xn interface. The CG 1 is the MCG and the CG 2 is the SCG. The semi-static frame structure configuration may be a cell-specific frame structure configuration and/or a UE-specific frame structure configuration.

The CG 2 transmits its own semi-static frame configuration to the CG 1 via the interface between the CG 1 base station and the CG 2 base station, for example, the Xn interface, and the CG 1 receives the semi-static frame configuration of the CG 2 via the interface between the CG 1 base station and the CG 2 base station, for example, the Xn interface. The CG 1 is the MCG and the CG 2 is the SCG. The semi-static frame structure configuration may be the cell-specific frame structure configuration and/or the UE-specific frame structure configuration.

The CG 1 transmits its own uplink time-domain resource configuration to the CG 2 via the interface between the CG 1 base station and the CG 2 base station, for example, the Xn interface, and the CG 2 receives the uplink time-domain resource configuration of the CG 1 via the interface between the CG 1 base station and the CG 2 base station, for example, the Xn interface. The CG 1 is the MCG and the CG 2 is the SCG. The uplink time-domain resource configuration refers to a time-domain resource configuration that may be used by the CG 1 possibly for an uplink transmission, and may be, for example, a "U" time-domain resource in the cell-specific frame structure configuration and/or an "X" time-domain resource in the cell-specific frame structure configuration and/or a "U" time-domain resource in the UE-specific frame structure configuration and/or an "X" time-domain resource in the UE-specific frame structure configuration.

The CG 2 transmits its own uplink time-domain resource configuration to the CG 1 via the interface between the CG 1 base station and the CG 2 base station, for example, the Xn interface, and the CG 1 receives the uplink time-domain resource configuration of the CG 2 via the interface between the CG 1 base station and the CG 2 base station, for example, the Xn interface. The CG 1 is the MCG and the CG 2 is the SCG. The uplink time-domain resource configuration refers to a time-domain resource configuration that may be used by the CG 2 possibly for an uplink transmission, and may be, for example, a "U" time-domain resource in the cell-specific frame structure configuration and/or an "X" time-domain resource in the cell-specific frame structure configuration and/or a "U" time-domain resource in the UE-specific frame structure configuration and/or an "X" time-domain resource in the UE-specific frame structure configuration.

After the CG 1 and the CG 2 exchange the frame structure configuration information, for a terminal whose UE capability is supporting Single Tx, the CG 1 and the CG 2 may avoid an uplink time-domain resource of another CG as much as possible when scheduling the uplink transmission of the present CG. However, for other terminals, avoiding the uplink time-domain resource of the other CG is not required to be considered.

Preferred Embodiment 2

The CG 1 and The CG 2 are used as the DC. In order to prevent the downlink transmission times of the CG 1 and the CG 2 conflict, that is, to prevent the transmission times of a certain downlink transmission Trans 1 on the CG 1 and a certain downlink transmission Trans 2 on the CG 2 from being completely or partially overlapped, frame structure configuration information is exchanged between the CG 1 site and the CG 2 site through the interface between the CG 1 base station and the CG 2 base station. Specifically, at least one of the following methods may be adopted.

The CG 1 transmits its own semi-static frame configuration to the CG 2 via the interface between the CG 1 base station and the CG 2 base station, for example, the Xn interface, and the CG 2 receives the semi-static frame configuration of the CG 1 via the interface between the CG 1 base station and the CG 2 base station, for example, the Xn interface. The CG 1 is the MCG and the CG 2 is the SCG. The semi-static frame structure configuration may be the cell-specific frame structure configuration and/or the UE-specific frame structure configuration.

The CG 2 transmits its own semi-static frame configuration to the CG 1 via the interface between the CG 1 base station and the CG 2 base station, for example, the Xn interface, and the CG 1 receives the semi-static frame configuration of the CG 2 via an X2 interface. The CG 1 is the MCG and the CG 2 is the SCG. The semi-static frame structure configuration may be the cell-specific frame structure configuration and/or the UE-specific frame structure configuration.

The CG 1 transmits its own downlink time-domain resource configuration to the CG 2 via the interface between the CG 1 base station and the CG 2 base station, for example, the Xn interface, and the CG 2 receives the uplink time-domain resource configuration of the CG 1 via the interface between the CG 1 base station and the CG 2 base station, for example, the Xn interface. The CG 1 is the MCG and the CG 2 is the SCG. The downlink time-domain resource configuration refers to a time-domain resource configuration that may be used by the CG 1 possibly for a downlink transmission, and may be, for example, a "D" time-domain resource in the cell-specific frame structure configuration and/or the "X" time-domain resource in the cell-specific frame structure configuration and/or a "D" time-domain resource in the UE-specific frame structure configuration and/or the "X" time-domain resource in the UE-specific frame structure configuration.

The CG 2 transmits its own downlink time-domain resource configuration to the CG 1 via the interface between the CG 1 base station and the CG 2 base station, for example, the Xn interface, and the CG 1 receives the downlink time-domain resource configuration of the CG 2 via the interface between the CG 1 base station and the CG 2 base station, for example, the Xn interface. The CG 1 is the MCG and the CG 2 is the SCG. The downlink time-domain resource configuration refers to a time-domain resource configuration that may be used by the CG 2 possibly for a downlink transmission, and may be, for example, the "D" time-domain resource in the cell-specific frame structure configuration and/or the "X" time-domain resource in the cell-specific frame structure configuration and/or the "D" time-domain resource in the UE-specific frame structure configuration and/or the "X" time-domain resource in the UE-specific frame structure configuration.

After the CG 1 and the CG 2 exchange the frame structure configuration information, for a terminal whose UE capability is supporting Single Tx, the CG 1 and the CG 2 may avoid a downlink time-domain resource of another CG as much as possible when scheduling the downlink transmission of the present CG. However, for other terminals, avoiding the downlink time-domain resource of the other CG is not required to be considered.

Preferred Embodiment 3

Figure 3:
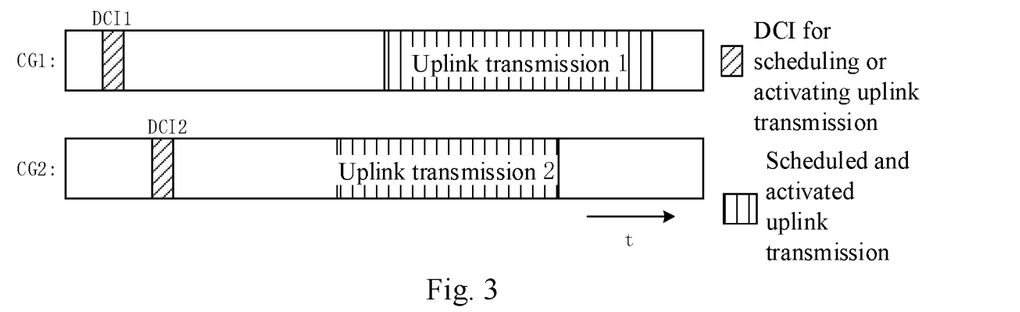
FIG. 3 is a diagram (I) of transmitting of a transmission according to a preferred embodiment of the present application.

A terminal (corresponding to the transmitting terminal in the foregoing embodiments) receives the DCI scheduling or activating uplink transmission at both the CG 1 and the CG 2, as shown in FIG. 3, the terminal receives DCI 1 on a certain carrier of the CG 1, and the DCI 1 schedules or activates an uplink transmission 1 on the CG 1. The terminal receives DCI 2 on a certain carrier of the CG 2, and the DCI 2 schedules or activates an uplink transmission 2 on the CG 2. The time-domain resources of the uplink transmission 1 and the uplink transmission 2 are partially or completely overlapped.

If a capability of the terminal is Single Tx, the terminal cannot simultaneously transmit multiple uplink transmissions on multiple CGs, and then for the uplink transmission 1 and the uplink transmission 2, the terminal needs to determine which uplink transmission can be transmitted, so that another uplink transmission needs to be cancelled. One decision principle is: the terminal transmits the uplink transmission of the DCI received firstly; and cancels the uplink transmission of the DCI received later. According to the decision principle, in FIG. 3, the terminal receives the DCI 1 scheduling or activating the uplink transmission 1 on the CG 1 first, and then receives the DCI 2 scheduling or activating the uplink transmission 2 an the CG 2, so that the terminal may transmit the uplink transmission 1 according to the indication of the DCI 1, and the terminal may cancel the uplink transmission 2 scheduled or activated by the DCI 2.

This decision principle may be applied to all time-domain resources, or only to a specific time-domain resource. If the decision principle is applied only to the specific time-domain resource, then it may be a time-domain resource that satisfies at least one of: the time-domain resource is an available uplink resource of the CG 1 and is configured to the terminal through a high-level signaling; the time-domain resource is an unavailable uplink resource of the CG 1 and is configured to the terminal through a high-level signaling; the time-domain resource includes an uplink resource of the CG 1 which can be used for HARQ-ACK feedback, and is configured to the terminal through a high-level signaling; the time-domain resource includes an uplink resource of the CG 1 which cannot be used for HARQ-ACK feedback, and is configured to the terminal through a high-level signaling; the time-domain resource is an available uplink resource of the CG 2 and is configured to the terminal through a high-level signaling; the time-domain resource is an unavailable uplink resource of the CG 2 and is configured to the terminal through a high-level signaling; the time-domain resource includes an uplink resource of the CG 2 which can be used for HARQ-ACK feedback, and is configured to the terminal through a high-level signaling; and the time-domain resource includes an uplink resource of the CG 2 which cannot be used for HARQ-ACK feedback, and is configured to the terminal through a high-level signaling.

In this embodiment, if the base station wants the terminal to guarantee an uplink transmission scheduled or activated on a CGx (the CGx is the CG 1 or the CG 2), the base station of the CGx needs to transmit the DCI scheduling or activating the uplink transmission to the terminal in the PDCCH as early as possible, so as to guarantee that the uplink transmission is not cancelled by other uplink transmissions which are scheduled or activated earlier and overlap with the uplink transmission.

Preferred Embodiment 4

The terminal receives the DCI scheduling or activating uplink transmission at both the CG 1 and the CG 2, as shown in FIG. 3, the terminal receives the DCI 1 on a certain carrier of the CG 1, and the DCI 1 schedules or activates uplink transmission 1 at the CG 1. The terminal receives the DCI 2 on a certain carrier of the CG 2, and the DCI 2 schedules or activates the uplink transmission 2 on the CG 2. The time-domain resources of the uplink transmission 1 and the uplink transmission 2 are partially or completely overlapped.

If the capability of the terminal is supporting Single Tx, the terminal cannot simultaneously transmit multiple uplink transmissions on multiple CGs, and then for the uplink transmission 1 and the uplink transmission 2, the terminal needs to determine which uplink transmission can be transmitted, so that another uplink transmission needs to be cancelled.

Figure 4:
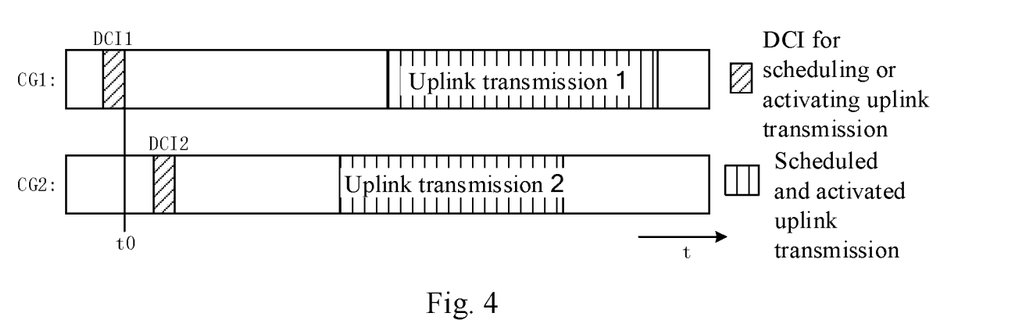
FIG. 4 is a diagram (II) of transmitting of a transmission according to a preferred embodiment of the present application.
Figure 5:
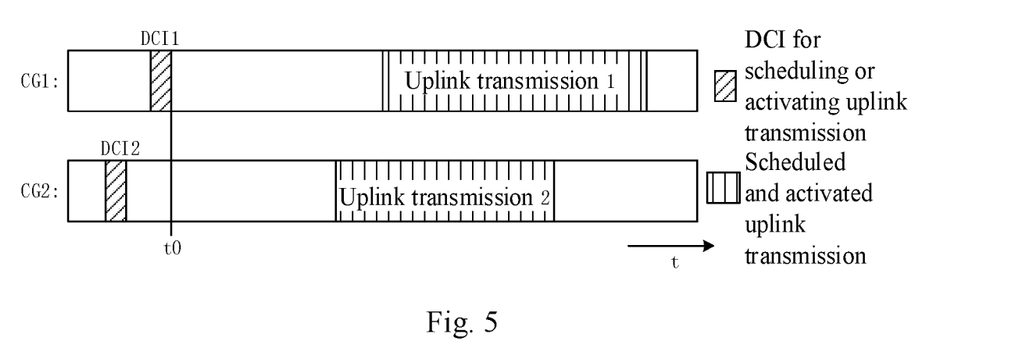
FIG. 5 is a diagram (III) of transmitting of a transmission according to a preferred embodiment of the present application.

After receiving the DCI for scheduling or activating a certain uplink transmission transmitted by a specific CG, the terminal always determines which uplink transmission is to be transmitted and which uplink transmission is to be cancelled between the uplink transmission and other uplink transmissions with time-domain resource overlapping with that of the uplink transmission. The specific CG may be an MCG or an LTE CG. The specific decision time may be the end symbol or the end slot at which the terminal receives the DCI on the specific CG. As shown in FIG. 4 and FIG. 5, the CG 1 is the specific CG, and t0 is the end symbol position of the DCI 1 transmitted on the CG 1, then no matter whether the DCI 2 transmitted on the CG 2 is transmitted before the DCI 1 or the DCI 2 is transmitted after the DCI 1, the terminal determines, after receiving the DCI 1, that is, at the time to, which of the uplink transmission 1 and the uplink transmission 2 is to be transmitted, and cancels the transmission of the other transmission accordingly. After the terminal makes a decision, the terminal does not make a decision again even if DCI indications of other CGs are received again.

For the case in FIG. 4, at time t0, the terminal has not received the DCI 2 transmitted by the CG 2, and then the terminal naturally considers that the uplink transmission 1 can be transmitted. After a while, the terminal receives the DCI 2 at the CG 2, and due to the uplink transmission 2 scheduled or activated by the DCI 2 overlapping with the uplink transmission 1 in time-domain resource, the terminal cancels the uplink transmission 2 on the CG 2.

For the case in FIG. 5, the terminal receives the DCI 2 on the CG 2 first, and at this time, the terminal does not immediately determine whether to transmit the uplink transmission 2 scheduled or activated by the DCI 2, but waits for a period of time to see whether DCI for scheduling or activating a certain uplink transmission transmitted by the CG 1 is received in a waiting time window. 1) If the terminal receives the DCI 1 in the waiting time window and the DCI 1 is used for scheduling or activating the uplink transmission 1, the terminal determines to transmit the uplink transmission 1 on the CG 1 according to the indication of the DCI 1, and cancels to transmit the uplink transmission 2 on the CG 2; and 2) if the terminal does not receive DCI scheduling or activating an uplink transmission on the CG 1 within the waiting time window, the terminal may determine to transmit the uplink transmission 2 on the CG 2.

Figure 6:
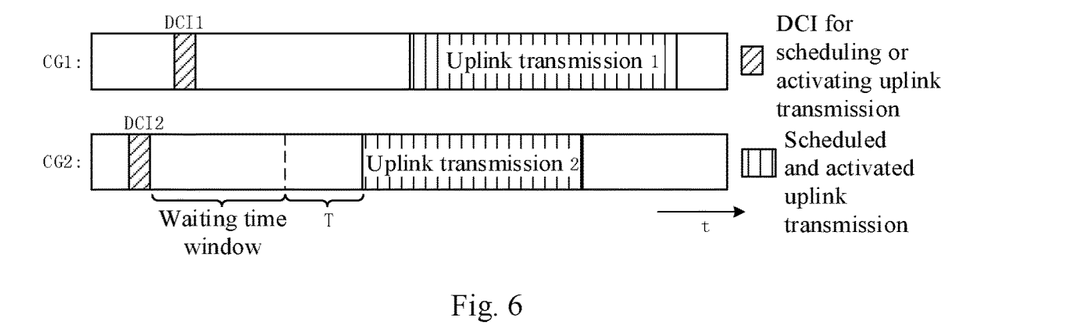
FIG. 6 is a diagram (IV) of transmitting of a transmission according to a preferred embodiment of the present application.
Figure 7:
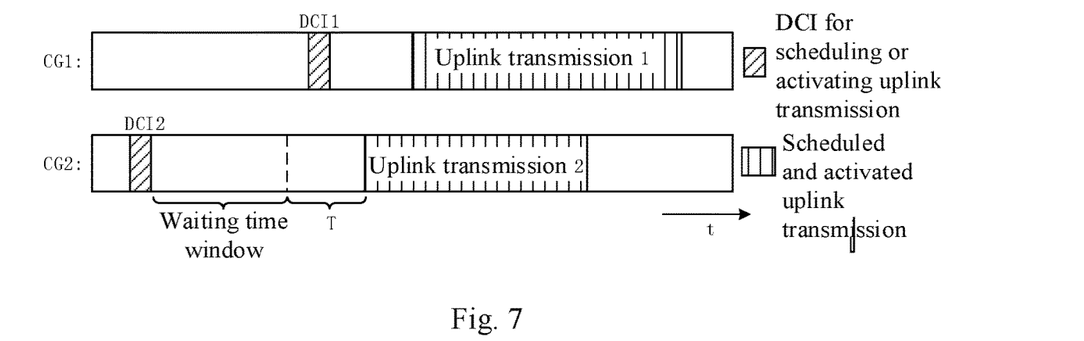
FIG. 7 is a diagram (V) of transmitting of a transmission according to a preferred embodiment of the present application.

The start and end positions of the waiting time window are as shown in FIGS. 6 and 7. The start position of the waiting time window is a symbol next to the end symbol of the DCI 2. The end position of the waiting time window is a symbol boundary position of T symbols or slots pushed backwards from the start symbol of the uplink transmission 2, i.e., the dashed line position in FIG. 6 and FIG. 7. It can be seen that the size of T determines the length of the waiting time window, and the size of T may be at least one of the followings.

T which is equal to $T_{proc,1}^{max}$ OFDM symbols, where $T_{proc,1}^{max}=(N_1+d_{1,1}+1)\cdot(2048+144)\cdot\kappa\cdot 2^{-\mu}\cdot T_C$. The value of $N_1$ relates to the capability of the terminal, Numerology (referring to a specific subcarrier interval or an OFDM symbol length or a slot length, etc.), and a DMRS time-frequency resource location. The value of $du_{1,1}$ relates to a PDSCH mapping type, the capability of the terminal, a PDCCH time-frequency resource position and a PDSCH time-domain length. $\mu$ relates to PDCCH Numerology, PDSCH Numerology, and Numerology for the uplink transmission. $T_C=1/(\Delta f_{max} \cdot N_f)$, where $\Delta f_{max}=480 \cdot 10^3$ Hz, and $T_C=1/(\Delta f_{max} \cdot N_f)$. $\kappa = T_S/T_C=64$, where $T_S=1/(\Delta f_{ref} \cdot N_{f,ref})$ and $\Delta f_{ref}=15 \cdot 10^3$ Hz $N_{f,ref}=2048$.

T which is equal to $T_{proc,release}^{max}$ OFDM symbols, where $T_{proc,release}^{max}=(N+1) \cdot (2048+144) \cdot \kappa \cdot 2^{-\mu} \cdot T_C$. The value of N relates to Numerology of the PDCCH and the capability of the terminal. The remaining parameters are explained above.

T which is equal to $T_{proc,2}^{max}$ OFDM symbol, where $T_{proc,2}^{max}=\max((N_2+d_{2,1}+1) \cdot (2048+144) \cdot \kappa \cdot 2^{-\mu} \cdot T_C, d_{2,2})$. The value of $N_2$ relates to the capability of the terminal, the PDCCH Numerology, and the Numerology for the uplink transmission. $d_{2,1}=0$ or $d_{2,1}=1$. $d_{2,2}=0$ or a BWP transition delay.

T which is equal to $T_{proc,CSI}^{max}$ OFDM symbols, where $T_{proc,CSI}=\max((Z+d) \cdot (2048+144) \cdot \kappa \cdot 2^{-\mu} \cdot T_C, d_{2,2})$. The value of Z relates to the capability of the terminal, the number of updated CSI reports, and the like. T is equal to the minimum value of a plurality of K2 candidate values semi-statically configured, and the unit is a slot. K2 is the time delay from DCI scheduling an uplink transmission to the uplink transmission, and the DCI is configured by the base station semi-statically for the terminal. The value of d is 2 or 3 or 4.

T which is equal to 0. In this case, the length of the waiting time window is from the symbol next to the end symbol of the DCI 2 to the symbol previous to the first symbol of the uplink transmission 2 time domain.

The OFDM symbol length may be: an OFDM symbol length under the Numerology of a BWP where the DCI 1 is located, an OFDM symbol length under the Numerology of a BWP where the DCI 2 is located, an OFDM symbol length under the Numerology of a BWP where the uplink transmission 1 is located, or an OFDM symbol length under the Numerology of a BWP where the uplink transmission 2 is located.

The slot length may be: a slot length under the Numerology of a BWP where the DCI 1 is located, a slot length under the Numerology of a BWP where the DCI 1 is located, a slot length under the Numerology of a BWP where the uplink transmission 1 is located, or a slot length under the Numerology of a BWP where the uplink transmission 2 is located.

The size of T may be able to be predefined by a system, or semi-statically configured to the terminal by a base station corresponding to the CG 1, or semi-statically configured to the terminal by a base station corresponding to the CG 2.

In FIG. 6, the terminal receives the DCI 1 for scheduling or activating the uplink transmission 1 transmitted on the CG 1 within the waiting time window, and then the terminal determines to transmit the uplink transmission 1 and cancel the uplink transmission 2.

In FIG. 7, the terminal does not receive any DCI transmitted on the CG 1 for scheduling or activating an uplink transmission within the waiting time window, and then the terminal determines to transmit the uplink transmission 2 according to the indication of the DCI 2 on the CG 2. Outside the waiting time window, although the terminal receives the DCI 1 for scheduling the uplink transmission 1 transmitted on the CG 1, and the uplink transmission 1 overlaps with the uplink transmission 2 in time-domain resources, because the terminal has already determined to transmit the uplink transmission 2, the terminal cancels to transmit the uplink transmission 1, that is, the terminal does not transmit the uplink transmission 1 according to the indication of the DCI 1.

The size of the value T relates to capabilities of the terminal, specifically relates to the capabilities such as whether the terminal supports Single Tx, whether the terminal supports look-ahead, and/or what extent can the terminal support the look-ahead, etc., and may be predefined by the system or semi-statically configured by the base station to the terminal.

Preferred Embodiment 5

Figure 8:
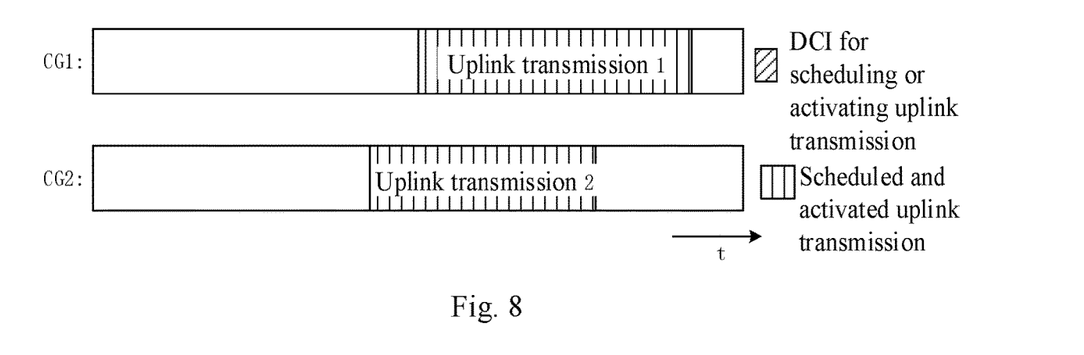
FIG. 8 is a diagram (VI) of transmitting of a transmission according to a preferred embodiment of the present application.

The terminal knows that there is the uplink transmission 1 waiting to be transmitted on the CG 1, there is the uplink transmission 2 waiting to be transmitted on the CG 2, and time-domain resources of the uplink transmission 1 and the uplink transmission 2 are completely or partially overlapped, according to the received DCI or semi-static configuration, as shown in FIG. 8.

If the capability of the terminal is supporting Single Tx and the terminal cannot simultaneously transmit multiple uplink transmissions on multiple CGs, then for the uplink transmission 1 and the uplink transmission 2, the terminal needs to determine which uplink transmission can be transmitted, so that another uplink transmission needs to be cancelled. It may be determined by the terminal according to at least one of the following rules.

If the uplink transmission 1 is the PRACH and the uplink transmission 2 is an uplink channel or signal other than the PRACH, the terminal transmits the uplink transmission 1 and cancels the uplink transmission 2.

If the uplink transmission 2 is the PRACH and the uplink transmission 1 is an uplink channel or signal other than the PRACH, the terminal transmits the uplink transmission 2 and cancels the uplink transmission 1.

If the uplink transmission 1 is an NR PRACH and the uplink transmission 2 is an uplink channel or signal other than an LTE PRACH, the terminal transmits the uplink transmission 1.

If the uplink transmission 2 is an NR PRACH and the uplink transmission 1 is an uplink channel or signal other than an LTE PRACH, the terminal transmits the uplink transmission 2 and cancels the uplink transmission 1.

If the uplink transmission 1 is a PUCCH or PUSCH including an NR HARQ-ACK, and the uplink transmission 2 does not include the NR HARQ-ACK, the terminal transmits the uplink transmission 1 and cancels the uplink transmission 2.

If the uplink transmission 2 is a PUCCH or PUSCH including an NR HARQ-ACK and the uplink transmission 1 does not include the NR HARQ-ACK, the terminal transmits the uplink transmission 2 and cancels the uplink transmission 1.

If the uplink transmission 1 is a PUCCH or PUSCH including NR UCI and the uplink transmission 2 does not include the NR UCI, the terminal transmits the uplink transmission 1 and cancels the uplink transmission 2.

If the uplink transmission 2 is a PUCCH or PUSCH including NR UCI and the uplink transmission 1 does not include the NR UCI, the terminal transmits the uplink transmission 2 and cancels the uplink transmission 1.

If the uplink transmission 1 is a URLLC transmission (specifically, a URLLC PUSCH or a URLLC PUCCH), and the uplink transmission 2 is a non-URLLC transmission, the terminal transmits the uplink transmission 1 and cancels the uplink transmission 2.

If the uplink transmission 2 is a URLLC transmission (specifically, a URLLC PUSCH or a URLLC PUCCH), and the uplink transmission 1 is a non-URLLC transmission, the terminal transmits the uplink transmission 2 and cancels the uplink transmission 1.

If the uplink transmission 1 is the PUCCH and the uplink transmission 2 is an uplink channel or signal other than the PUCCH, the terminal transmits the uplink transmission 1 and cancels the uplink transmission 2.

If the uplink transmission 2 is the PUCCH and the uplink transmission 1 is an uplink channel or signal other than the PUCCH, the terminal transmits the uplink transmission 2 and cancels the uplink transmission 1.

If the uplink transmission 1 is a PUCCH or PUSCH including an HARQ-ACK, and the uplink transmission 2 is an uplink channel or signal not including an HARQ-ACK, the terminal transmits the uplink transmission 1 and cancels the uplink transmission 2.

If the uplink transmission 1 is a PUCCH or a PUSCH including an LTE HARQ-ACK, and the uplink transmission 2 does not include an HARQ-ACK, the transmitting terminal transmits the uplink transmission 1 and cancels the uplink transmission 2.

And if the uplink transmission 2 is a PUCCH or PUSCH including an HARQ-ACK and the uplink transmission 1 is an uplink channel or signal not including the HARQ-ACK, the terminal transmits the uplink transmission 2 and cancels the uplink transmission 1.

If the uplink transmission 1 is a PUSCH or PUCCH scheduled by DCI, or SRS, and the uplink transmission 2 is a semi-statically configured transmission or transmission resource, such as a configured grant resource (used for the transmission of a configured grant PUSCH), a PUCCH, a PRACH, or an SRS, the terminal transmits the uplink transmission 2 and cancels the uplink transmission 1.

If the uplink transmission 1 is an LTE PUSCH or LTE PUCCH scheduled by LTE DCI, or an LTE SRS, and the uplink transmission 2 is a transmission or transmission resource configured by a RRC signaling, for example, a configured grant resource, an NR PUCCH, an NR PRACH or an NR SRS, the transmitting terminal transmits the transmission 2 and cancels the transmission 1.

If the CG 1 is the MCG and the CG 2 is the SCG, the terminal transmits the uplink transmission 1 and cancels the uplink transmission 2.

If the CG 2 is the MCG and the CG 1 is the SCG, the terminal transmits the uplink transmission 2 and cancels the uplink transmission 1.

If the CG 1 is the LTE CG and the CG 2 is the NR CG, the terminal transmits the uplink transmission 1 and cancels the uplink transmission 2.

If the CG 2 is the LTE CG and the CG 1 is the NR CG, the terminal transmits the uplink transmission 2 and cancels the uplink transmission 1.

By adopting the technical scheme of the embodiments and the preferred embodiments of the invention, the following beneficial effects can be realized.

When the LTE system and the NR system coexist, if there are uplink transmissions overlapping in a time domain on an LTE CG and an NR CG, the terminal may determine a CG on which an uplink transmission is guaranteed to be transmitted, according to the method in the present application.

When the LTE system and the NR system coexist, if there are downlink transmissions overlapping in a time domain on an LTE CG and an NR CG, the terminal may determine a CG on which a downlink transmission is guaranteed to be transmitted, according to the method in the present application.

When multiple CGs in the NR system or LTE system are configured as a DC, and there are uplink transmissions overlapping in a time domain on the multiple CGs, the terminal may determine a CG on which an uplink transmission is guaranteed to be transmitted, according to the method in the present application.

When multiple CGs in the NR system or LTE system are configured as a DC, and there are downlink transmissions overlapping in a time domain on the multiple CGs, the terminal may determine a CG on which a downlink transmission is guaranteed to be transmitted, according to the method in the present application.

The embodiments of the present application further provide a storage medium including a stored program. When the above program is executed, any one of the above methods is performed.

Alternatively, in the present embodiment, the storage medium may be configured to store program codes for performing the following steps.

In step S1, it is determined by a transmitting terminal to transmit a first transmission or a second transmission by at least one of following means: the transmitting terminal determining the first transmission or the second transmission according to received DCI; the transmitting terminal determining the first transmission or the second transmission no later than a time threshold; or the transmitting terminal determining the first transmission or the second transmission according to a specified rule. The DCI is used for scheduling or activating at least one of the first transmission and the second transmission.

In step S2, the determined first transmission or second transmission is transmitted by the transmitting terminal.

Optionally, in the present embodiment, the storage medium may include but is not limited to: various media capable of storing program codes, such as a USB disk, a ROM, a RAM, a removable hard disk, a magnetic disk, or an optical disk.

Optionally, for a specific example in this embodiment, reference may be made to the examples described in the above embodiments and optional implementation, and present embodiment is not described herein again.

It will be apparent to those skilled in the art that the modules or steps of the present application described above may be implemented by a general purpose computing device, they may be centralized on a single computing device or distributed across a network of computing devices, and alternatively, they may be implemented by program code executable by a computing device, such that they may be stored in a memory device and executed by a computing device, and in some cases, the steps shown or described may be executed out of order, or separately as integrated circuit modules, or multiple modules or steps thereof may be implemented as a single integrated circuit module. Thus, the present application is not limited to any specific combination of hardware and software.

The above description is only a preferred embodiment of the present application and is not intended to limit the present application, and various modifications and changes may be made to the present application by those skilled in the art. Any modification, equivalent replacement, improvement and the like made within the principle of the present application shall be included in the protection scope of the present application.

The invention claimed is:

1. A transmitting method for transmission, applied to a transmitting terminal, comprising:
   determining, by the transmitting terminal, in response to firstly received downlink control information (DCI) for scheduling or activating the first transmission, to transmit a first transmission, and cancelling to transmit a second transmission;
   determining, by the transmitting terminal, in response to the firstly received DCI for scheduling or activating the second transmission, to transmit the first transmission or the second transmission no later than a time threshold; and
   transmitting, by the transmitting terminal, the determined first transmission or second transmission, wherein determining to transmit the first transmission or the second transmission no later than the time threshold comprises:
   determining to transmit the first transmission in response to receiving, within the time threshold, the DCI for scheduling or activating the first transmission, and determining to transmit the second transmission in response to not receiving, within the time threshold, the DCI for scheduling or activating the first transmission.

2. The method of claim 1, wherein time-domain resources of the first transmission and the second transmission overlap completely or partially.

3. The method of claim 1, wherein the transmitting terminal determines to transmit the first transmission or the second transmission in a specific time-frequency resource, and the specific time-domain resource satisfies at least one of:
   the specific time-domain resource comprises an available uplink resource of a carrier group (CG) 1;
   the specific time-domain resource comprises an unavailable uplink resource of the CG 1;
   the specific time-domain resource comprises an available uplink resource of a CG 2;
   the specific time-domain resource comprises an unavailable uplink resource of the CG 2; or
   the specific time-domain resource is configured to the transmitting terminal through a high-level signaling.

4. The method of claim 1, wherein a minimum value of the time threshold comprises a first time unit after a time unit in which the DCI for scheduling or activating the second transmission is received by the transmitting terminal; and a maximum value of the time threshold comprises time units from the first time unit after the time unit in which the DCI for scheduling or activating the second transmission is received by the transmitting terminal, to a time unit forward T time units from a start time unit of the second transmission, wherein T is an integer.

5. The method of claim 1, wherein a maximum value of the time threshold is associated with a processing delay at the transmitting terminal.

6. The method of claim 1, wherein a maximum value of the time threshold is predefined by a system or semi-statically configured by a base station to the transmitting terminal, and T is predefined by the system or semi-statically configured by the base station to the terminal.

7. The method of claim 1, wherein a maximum value of the time threshold is associated with a look-ahead capability of the transmitting terminal.

8. The method of claim 1, further comprising:
   determining, by the transmitting terminal, to transmit the first transmission or the second transmission according to at least one of a transmission type of the first transmission and a transmission type of the second transmission.

9. The method of claim 8, wherein the transmitting terminal determining to transmit the first transmission or the second transmission according to at least one of the transmission type of the first transmission and the transmission type of the second transmission comprises one of:
   determining, by the transmitting terminal, to transmit the first transmission and cancel the second transmission, in a case of the first transmission being a Physical Random Access Channel (PRACH) and the second transmission being an uplink channel or signal other than the PRACH;
   determining, by the transmitting terminal, to transmit the second transmission and cancel the first transmission, in a case of the second transmission being the PRACH and the first transmission being an uplink channel or signal other than the PRACH;
   determining, by the transmitting terminal, to transmit the first transmission and cancel the second transmission, in a case of the first transmission being a New Radio (NR) PRACH and the second transmission being an uplink channel or signal other than a Long Term Evolution (LTE) PRACH;
   determining, by the transmitting terminal, to transmit the second transmission and cancel the first transmission, in a case of the second transmission being the NR PRACH and the first transmission being an uplink channel or signal other than the LTE PRACH;
   determining, by the transmitting terminal, to transmit the first transmission and cancel the second transmission, in a case where the first transmission is a Physical Uplink Control Channel (PUCCH) or Physical Uplink Shared Channel (PUSCH) comprising an NR Hybrid Automatic Repeat reQuest Acknowledgement (HARQ-ACK), and the second transmission does not comprise the NR HARQ-ACK;
   determining, by the transmitting terminal, to transmit the second transmission and cancel the first transmission, in a case where the second transmission is the PUCCH or PUSCH comprising the NR HARQ-ACK, and the first transmission does not comprise the HARQ-ACK;
   determining, by the transmitting terminal, to transmit the first transmission and cancel the second transmission, in a case where the first transmission is a PUCCH or PUSCH comprising NR uplink control information (UCI), and the second transmission does not comprise the NR UCI;
   determining, by the transmitting terminal, to transmit the second transmission and cancel the first transmission, in a case where the second transmission is the PUCCH or PUSCH comprising the NR UCI, and the first transmission does not comprise the NR UCI;
   determining, by the transmitting terminal, to transmit the first transmission and cancel the second transmission, in a case of the first transmission being a URLLC transmission and the second transmission being a non-URLLC transmission;
   determining, by the transmitting terminal, to transmit the second transmission and cancel the first transmission, in a case of the second transmission being the URLLC transmission, and the first transmission being the non-URLLC transmission;
   determining, by the transmitting terminal, to transmit the first transmission and cancel the second transmission, in a case of the first transmission being a PUCCH and the second transmission being an uplink channel or signal other than the PUCCH;

determining, by the transmitting terminal, to transmit the second transmission and cancel the first transmission, in a case of the second transmission being the PUCCH and the first transmission being an uplink channel or signal other than the PUCCH;

determining, by the transmitting terminal, to transmit the first transmission and cancel the second transmission, in a case where the first transmission is a PUCCH or PUSCH comprising an HARQ-ACK, and the second transmission is an uplink channel or signal that does not comprise an HARQ-ACK;

determining, by the transmitting terminal, to transmit the second transmission and cancel the first transmission, in a case where the second transmission is the PUCCH or PUSCH comprising the HARQ-ACK, and the first transmission is an uplink channel or signal that does not comprise an HARQ-ACK; and determining, by the transmitting terminal, to transmit the second transmission and cancel the first transmission, in a case where the first transmission is a PUSCH or PUCCH scheduled by DCI or a Sounding Reference Signal (SRS), and the second transmission is a transmission or transmission resource configured by a Radio Resource Control (RRC) signaling.

10. The method of claim 1, further comprising:

determining, by the transmitting terminal, to transmit the first transmission and cancel the second transmission, in a case of a carrier group (CG) 1 being a main carrier group (MCG) and a CG 2 being a secondary cell group (SCG);

determining, by the transmitting terminal, to transmit the second transmission and cancel the first transmission, in a case of the CG 2 being the MCG and the CG 1 being the SCG;

determining, by the transmitting terminal, to transmit the first transmission and cancel the second transmission, in a case of the CG 1 being an LTE CG and the CG 2 being an NR CG; and determining, by the transmitting terminal, to transmit the second transmission and cancel the first transmission, in a case of the CG 2 being the LTE CG and the CG 1 being the NR CG.

11. The method of claim 1, wherein the first transmission is scheduled to be transmitted on a first carrier or a first carrier group (CG), and the second transmission is scheduled to be transmitted on a second carrier or a second CG.

12. A non-transitory computer-readable storage medium, having a computer program stored thereon, the computer program is configured to be executed by a processor to cause the processor to perform:

determining, in response to firstly received downlink control information (DCI) for scheduling or activating a first transmission, to transmit the first transmission, and cancelling to transmit a second transmission;

determining, in response to the firstly received DCI for scheduling or activating the second transmission, to transmit the first transmission or the second transmission no later than a time threshold; and transmitting the determined first transmission or second transmission, wherein determining to transmit the first transmission or the second transmission no later than the time threshold comprises:

determining to transmit the first transmission in response to receiving, within the time threshold, the DCI for scheduling or activating the first transmission, and determining to transmit the second transmission in response to not receiving, within the time threshold, the DCI for scheduling or activating the first transmission.

13. The storage medium of claim 12, wherein time-domain resources of the first transmission and the second transmission overlap completely or partially.

14. The storage medium of claim 12, wherein the computer program is configured to be executed by the processor to cause the processor to determine to transmit the first transmission or the second transmission in a specific time-frequency resource, and the specific time-domain resource satisfies at least one of:

the specific time-domain resource comprises an available uplink resource of a carrier group (CG) 1;

the specific time-domain resource comprises an unavailable uplink resource of the CG 1;

the specific time-domain resource comprises an available uplink resource of a CG 2;

the specific time-domain resource comprises an unavailable uplink resource of the CG 2; or the specific time-domain resource is configured to a transmitting terminal through a high-level signaling.

15. The storage medium of claim 12, wherein a minimum value of the time threshold comprises a first time unit after a time unit in which the DCI for scheduling or activating the second transmission is received; and a maximum value of the time threshold comprises time units from the first time unit after the time unit in which the DCI for scheduling or activating the second transmission is received by the transmitting terminal, to a time unit forward T time units from a start time unit of the second transmission, wherein T is an integer.

16. The storage medium of claim 12, wherein a maximum value of the time threshold is associated with a processing delay at a transmitting terminal.

17. The storage medium of claim 12, wherein a maximum value of the time threshold is predefined by a system or semi-statically configured by a base station to a transmitting terminal, and T is predefined by the system or semi-statically configured by the base station to the terminal.

18. The storage medium of claim 12, wherein a maximum value of the time threshold is associated with a look-ahead capability of a transmitting terminal.

19. The storage medium of claim 12, wherein the computer program is configured to be executed by the processor to cause the processor to perform:

determining to transmit the first transmission or the second transmission according to at least one of a transmission type of the first transmission and a transmission type of the second transmission.

20. The storage medium of claim 12, wherein the computer program is configured to be executed by the processor to cause the processor to perform:

determining, by the transmitting terminal, to transmit the first transmission and cancel the second transmission, in a case of a carrier group (CG) 1 being a main carrier group (MCG) and a CG 2 being a secondary cell group (SCG);

determining, by the transmitting terminal, to transmit the second transmission and cancel the first transmission, in a case of the CG 2 being the MCG and the CG 1 being the SCG;

determining, by the transmitting terminal, to transmit the first transmission and cancel the second transmission, in a case of the CG 1 being an LTE CG and the CG 2 being an NR CG; and determining, by the transmitting terminal, to transmit the
second transmission and cancel the first transmission,
in a case of the CG 2 being the LTE CG and the CG 1
being the NR CG.

\* \* \* \* \*

UNITED STATES PATENT AND TRADEMARK OFFICE
CERTIFICATE OF CORRECTION

| | | |
|---|---|---|
| PATENT NO. | : 12,096,452 B2 | Page 1 of 1 |
| APPLICATION NO. | : 17/599890 | |
| DATED | : September 17, 2024 | |
| INVENTOR(S) | : Chenchen Zhang et al. | |

It is certified that error appears in the above-identified patent and that said Letters Patent is hereby corrected as shown below:

In the Specification

Column 5, Lines 44-45, the formula reading:

$$T_{\text{proc},2}^{\max} = \left((N_2 + d_{2,1} + 1) \cdot (2048 + 144) \cdot \kappa \cdot 2^{-\mu} \cdot T_C, \ d_{2,2}\right)$$

Should read:

$$T_{\text{proc},2}^{\max} = \max\left((N_2 + d_{2,1} + 1) \cdot (2048 + 144) \cdot \kappa \cdot 2^{-\mu} \cdot T_C, \ d_{2,2}\right)$$

Signed and Sealed this
Twentieth Day of May, 2025

Coke Morgan Stewart
*Acting Director of the United States Patent and Trademark Office*